United States Patent
Juura

(10) Patent No.: US 6,425,466 B1
(45) Date of Patent: Jul. 30, 2002

(54) BRAKE SYSTEM AND A METHOD FOR ASSEMBLING THEREOF

(76) Inventor: Akira Juura, 1-7-27 Kasuya, Setagaya-ku, Tokyo 157-0063 (JP)

(*) Notice: Subject to any disclaimer, the term of this patent is extended or adjusted under 35 U.S.C. 154(b) by 0 days.

(21) Appl. No.: 10/020,682

(22) Filed: Dec. 14, 2001

Related U.S. Application Data

(62) Division of application No. 09/356,084, filed on Jul. 16, 1999.

(51) Int. Cl.$^7$ ............................................. F16D 65/00
(52) U.S. Cl. ...................................... 188/73.2; 188/72.4
(58) Field of Search ........................ 188/72.1, 72.4, 188/72.5, 73.1, 73.2, 73.35; 29/458

(56) References Cited

U.S. PATENT DOCUMENTS

| | | | | |
|---|---|---|---|---|
| 3,722,634 A | * | 3/1973 | Ogasawara et al. | 181/207 |
| 3,998,466 A | * | 12/1976 | Kondo | 188/72.5 |
| 4,360,082 A | * | 11/1982 | Haraikawa et al. | 188/344 |
| 4,375,842 A | * | 3/1983 | Melinat | 188/196 P |
| 4,382,493 A | * | 5/1983 | La Warre, Sr. | 188/73.35 |
| 4,502,572 A | * | 3/1985 | Davidson et al. | 188/264 B |
| 4,503,946 A | * | 3/1985 | Davidson et al. | 188/71.9 |
| 4,727,619 A | * | 3/1988 | Robbins | 134/169 A |
| 5,316,115 A | * | 5/1994 | Urban | 188/325 |
| 5,558,345 A | * | 9/1996 | Kobayashi et al. | 188/72.4 |
| 6,349,802 B1 | * | 2/2002 | Juura | 188/73.2 |

* cited by examiner

*Primary Examiner*—Paul N. Dickson
*Assistant Examiner*—Devon Kramer
(74) *Attorney, Agent, or Firm*—Norris, McLaughlin & Marcus P.A.

(57) ABSTRACT

A caliper for use in a disk brake system where a sufficient amount of grease exists at least in a space formed between a groove for setting a piston seal provided on the inside surface of the caliper body and a piston seal to be set therein, in a space formed between the outer surface of dust boots and said caliper body, and in a space formed by the dust boots, the caliper body, the piston and the piston seal; and a wheel cylinder for use in a drum brake system where a sufficient amount of grease exists at least in a space formed between a piston and a cup seal and in a space formed by the piston, a cylinder body and dust boots.

7 Claims, 6 Drawing Sheets

BRAKE SYSTEM AND A METHOD FOR ASSEMBLING THEREOF

The present application is divisional application of U.S. Ser. No. 09/356,084 filed Jul. 16, 1999.

BACKGROUND OF THE INVENTION

1) Field of the Invention

The present invention relates to a brake system, particularly, relates to a caliper for use in a hydrostatic disk brake system and a wheel cylinder for use in a hydrostatic drum brake system, which are used in motor vehicles, airplanes, trains, etc. The present invention also relates to a method for assembling the caliper of a hydrostatic brake system.

2) Related Art Statement

Hydrostatic brake systems are generally used for the braking systems of motor vehicles, airplanes, or trains. The hydrostatic brake system is roughly classified into a disk brake system and a drum brake system. In either systems, a braking operation is carried out in such a manner that a brake master cylinder works to pressurize brake fluid contained in the master cylinder responding to the braking operation by an operator, the pressure is transmitted to a caliper (disk brake system) or a wheel cylinder (drum brake system), and in the caliper or the wheel cylinder, a piston works to effect the braking operation in accordance with the pressure of the brake fluid.

During the braking operation, it is required that the piston is closely adhered onto the inside wall of the cylinder in the caliper body in order to prevent a leakage of brake fluid and to realize a smooth movement of the piston. Thus, in case of a disk brake system, a piston seal is provided inside of a caliper, while, in case of a drum brake system, a piston cup is provided inside of a wheel cylinder. In a disk brake system, a groove is provided inside of the cylinder of the caliper body to hold the piston seal therein. While, there are two types of drum brake system, one of which is a unified type where a groove is provided on an outer surface of the piston for holding the piston cup therein; the other one of which is a separated type where no groove is provided but the piston cup is brought into contact with the outer surface of the piston. The piston seal or the piston cup operates a pad or a lining via the piston to generate a braking force when the pressure of the brake fluid is transmitted.

In assembling such a caliper or a wheel cylinder, a piston seal or a piston cup being treated with an oil material on the surface thereof is used in order to make the assembling procedure easier. The operator sometimes uses grease to assemble the caliper or the wheel cylinder. However, the amount of grease used is very little and only for the purpose of making the assembling procedure of the piston seal or the piston cup into the caliper body or the cylinder body easy.

However, the caliper or the wheel cylinder assembled in the conventional manner has a problem as mentioned below.

In the conventional caliper for use in a disk brake system, when a brake pedal is stepped on to generate hydrostatic pressure, the piston of the brake system is pushed as well as the piston seal, then the piston seal is twisted. While, when the hydrostatic pressure is released, the twisted condition of the piston seal is retrieved so that the piston is aligned into its initial position by the self-aligning force of the piston seal. In such a caliper, if the caliper is used for a long time, the contact portion between the piston and the piston seal becomes not to work normally due to a variation of temperature of the outside, a variation of temperature when vehicles are running, rust, or dust generated by the piston seal, so that the piston becomes not to be returned properly. If the contacted portion between the piston and the piston seal does not work normally, so-called shaking phenomenon of the piston per se generates and such a movement of the piston may scratch the inner surface of the cylinder. By such an abnormal movement of the piston, so-called "brake drag" or a leakage of oil would be caused so that the braking ability of the system would be decreased. Further, the disk pad would be abraded so much by this "brake drag" phenomenon, a great amount of dust is generated from the pads during the braking operation and the dust is sprinkled in an atmosphere. The dust gives a non-healthy influence to human bodies and once the dust adheres onto wheels, etc., it is very difficult to remove it.

The conventional wheel cylinder has the same problem. In the conventional wheel cylinder, since only a small amount of grease is used for assembling the piston cup into the wheel cylinder, if such a wheel cylinder is used for a long time, the piston operation would not work well by a friction caused between the piston cup and the cylinder body.

SUMMARY OF THE INVENTION

The present invention is carried out in order to solve the above-mentioned problem. The first aspect of the present invention is a caliper for use in a disk brake system, which comprises at least a caliper body having a cylinder portion, a piston, a piston seal and dust boots, said caliper body having a first groove for holding said piston seal and a second groove for holding said dust boots, and said piston having a third groove for holding said dust boots; wherein at least a space formed between the first groove for positioning said piston seal, which is provided in an inside surface of the cylinder portion of said caliper body, and said piston seal being positioned in said first groove, a space between an outer side surface of said dust boots and said caliper body, in a space between an inner side surface of said dust boots and said piston, and a space formed by said dust boots, said caliper body, said piston and said piston seal, are filled with grease.

According to the first aspect of the present invention, out of the portions where the piston seal and the piston are made to contact together in the caliper of the disk brake system, the inside from the piston seal would be covered by an oil film of a brake fluid, while, the outside from the piston (the dust boots side) is covered by an oil film of the grease. Therefore, it can be prevented that the temperature at this contact portion becomes high or that the operation of the caliper becomes out of order due to an impurity such as rust or dust, so that it becomes possible to keep the movement of the piston seal and the piston in the best condition for a long time. In this manner, in the caliper according to the present invention, the piston always works in a proper condition and therefore only the pressure of brake fluid transmitted from the master cylinder is properly applied to the contact portion of the piston and the piston seal so that the force of the piston is transmitted to the disk pad without generating any excessive force.

In the caliper of the disk brake system according to the present invention, it is preferred to provide another groove on the inside surface of the cylinder of the caliper body between the first groove formed in said caliper body for positioning said piston seal and the second groove for positioning said dust boots. Because, the grease is apt to be kept in the third groove, so that it becomes easy to hold the grease in the really necessary portion, i.e. the space formed by the dust boots, the caliper body, the piston and the piston seal.

The present invention can be applied not only to a normal type (opposite piston type) of caliper but also to a floating type of caliper. In the floating type caliper, the caliper body is movably installed with the aid of a pin, and a connecting portion for connecting the caliper body and said pin is covered by dust boots. According to the invention, it is required that a sufficient amount of grease exists in a space formed by the dust boots and the pin, in a space formed between the dust boots and an inner surface of a pin receiving section of the caliper body, and in a space formed between an outer surface of the pin and the inner surface of the pin receiving section of the caliper body.

The second aspect of the present invention is a wheel cylinder for use in a drum brake system which comprises at least a cylinder body, a piston which is to be positioned inside of said cylinder body, a cup seal provided between said cylinder body and said piston, dust boots for covering said cylinder body and said piston, wherein at least a space formed between said piston and said cup seal and a space formed by said piston, said cylinder body and said dust boots are filled with grease.

In this manner, in the drum brake system, it also becomes possible to prevent an abnormal operation of the wheel cylinder by filling the space between the piston and the cup seal, and the space formed by the piston, the cylinder body and the dust boots with grease, and thus the piston works in a stable manner for a long time.

Further, when assembling the caliper for use in a disk brake system, it is preferred that when installing the piston into the caliper body, said grease is applied at least a half of the outer surface of the piston from its inserting side, then penetrating the piston having the grease on the half of the outer surface thereof into the caliper body (cylinder portion), so that the grease exists in the space formed by the dust boots, the caliper body, the piston and the piston seal sufficiently.

According to this assembling method, it becomes possible to put a sufficient amount of grease in a desired portion, i.e. the space formed by the piston, the piston seal, the dust boots, very easily.

Furthermore, when assembling the caliper for use in a disk brake system, it is preferred that when installing the piston into the cylinder portion, after penetrating said piston into the cylinder from the top portion of the piston until the top portion reaches to the sequel of the piston seal, then extracting the piston once, and then applying the grease and penetrating the piston into the caliper body again. By this operation, the initial fitting of the piston and the piston seal becomes better.

It should be noted that if the operation of penetrating and extracting the piston is repeated, applying some grease on the surface of the piston, the fitting of the piston and the piston seal becomes much better and a sufficient and proper amount of grease can exist in the desired space easily.

DETAILED EXPLANATION OF THE PREFERRED EMBODIMENTS

Preferred embodiments of the present invention will be explained below on the basis of the attached drawings.

Figure 1:
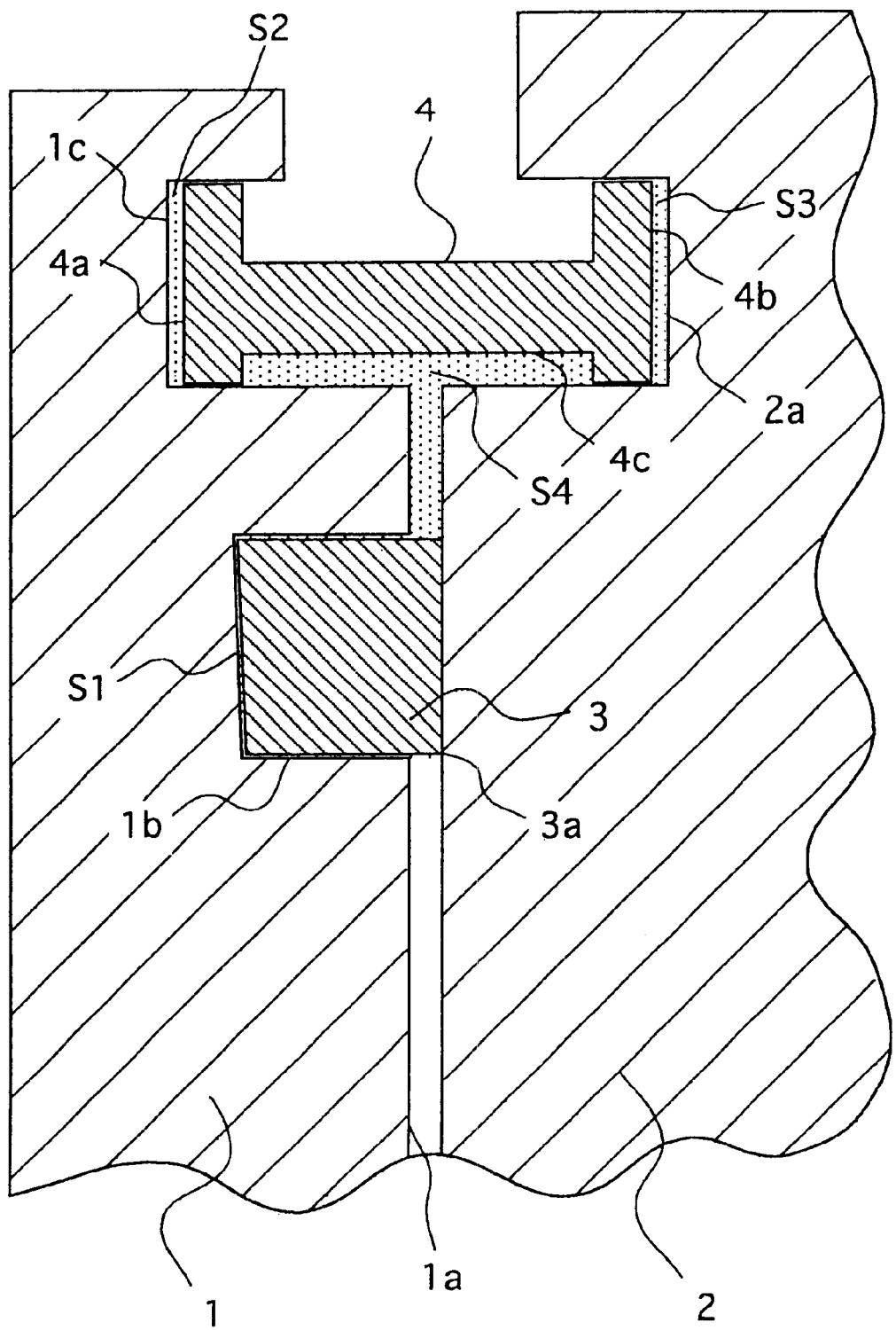
FIG. 1 is a cross-sectional view partially showing a caliper for use in a disk brake system according to a first embodiment of the present invention.

FIG. 1 is a cross-sectional view showing a construction of the first embodiment of the present invention where a caliper for use in a disk brake system is partially illustrated. In FIG. 1, the numerical reference 1 denotes a caliper body, 2 a piston, 3 a piston seal, 4 dust boots. The caliper body 1 comprises a cylinder portion 1a, and in the cylinder portion 1a, is provided a first groove 1b for assembling the piston seal 3 in the caliper body 1 is further provided a second groove 1c for setting the dust boots 4, while, on the outer surface of the piston 2, is provided a third groove 2a, which is opposite to said first groove 1a, for setting the dust boots 4 therein.

As shown in FIG. 1, according to the first embodiment, a sufficient amount of grease is provided in a space S1, which is formed between the inner surface of the groove 1b formed in the caliper portion 1a for setting the piston seal 3 and the outer surface of the piston seal 3, which is opposite to the inner surface of the first groove 1b; in a space S2 formed between the outer surface 4a of the dust boots 4 and the inner surface of the second groove 1b formed in the caliper body 1 for setting the dust boots 4; in a space S3 formed between the inner surface 4b of the dust boots 4 and the groove 2a formed in the piston 2 for installing the dust boots 4; and in a space S4 formed by a concave portion 4c of the dust boots 4, which is positioned on a piston seal side of the boots, a part of the caliper body 1, a part of the inner surface of the piston 2, and a part of the surfaces of the piston seal 3, which is positioned on the dust boots 4 side.

It should be noted that the grease also exists on a contact surface between the dust boots 4 and the piston 3 and on a contact surface between the dust boots 4 and the caliper body 1 by putting a sufficient amount of grease in the spaces S2 and S3.

By the existence of the grease in these spaces, the inner side (dust boots side) of the piston seal 3 is filled with grease, on the other hand, the outer side of the dust boots 4 is filled with brake fluid, so that the movement of the piston seal 3 becomes smooth and a shaking phenomenon of the piston 2 can be prevented. Further, since no rust or no dust is generated inside of the caliper, the movement of the piston in the caliper becomes extremely stable, so that so-called "brake drag" of the brake system as a whole can be prevented.

The same effect can be obtained in the drum brake system.

Figure 2:
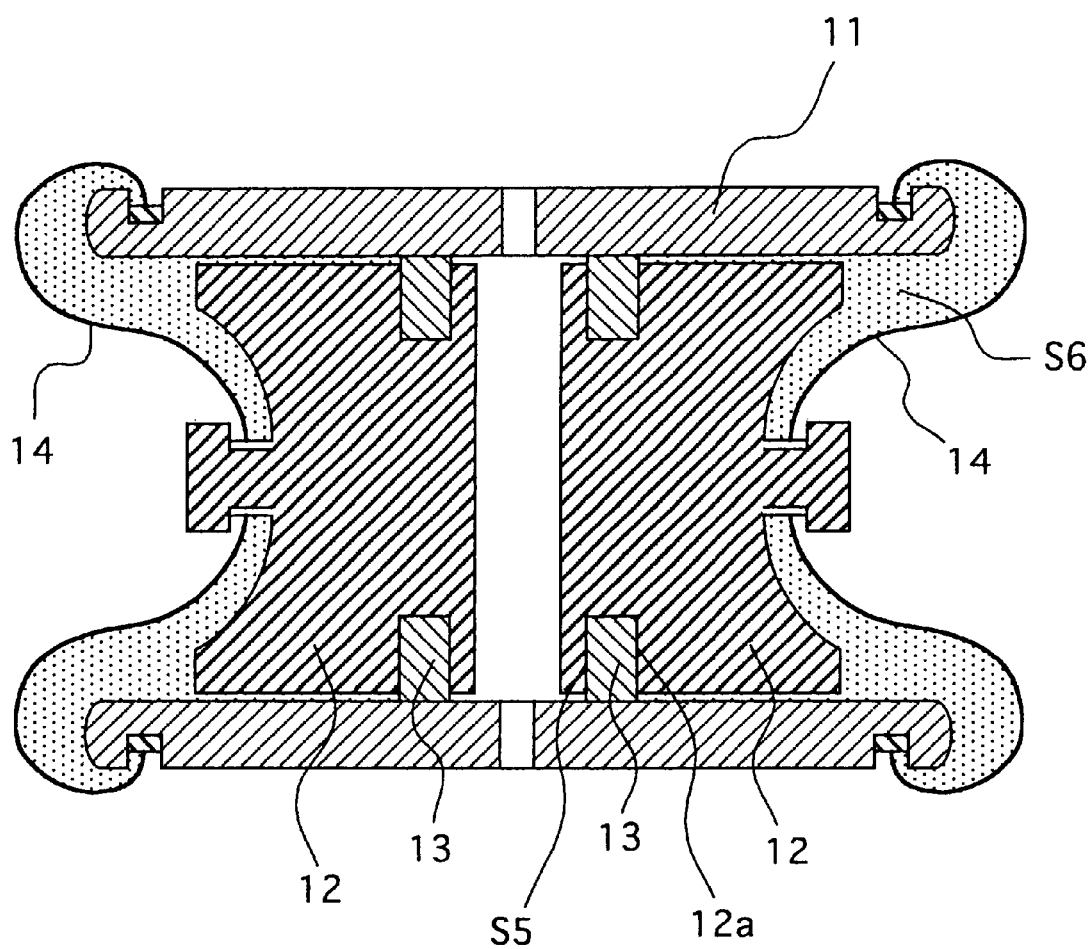
FIG. 2 is a cross-sectional view partially depicting a wheel cylinder for use in a drum brake system according to a second embodiment of the present invention.

FIG. 2 is a cross-sectional view showing a construction of the second embodiment of the present invention where a wheel cylinder for use in a drum brake system is partially illustrated.

In FIG. 2, the numerical reference 11 represents a cylinder body, 12 a piston, 13 a cup seal, 14 dust boots. In this embodiment, a groove 12a is provided in the piston 12 for setting a cup seal 13 there. As shown in FIG. 2, a sufficient amount of grease exists in a space S5 formed between the groove 12a in the piston 12 and the cup seal 13 and in the space S6 formed by a part of the inner surface of the cylinder body 11, a part of the outer surface of the piston 12 and the dust boots 14.

According to this arrangement, the inside from the cup seal 13 in the cylinder body 11 is filled with the grease and outside from the cup seal 13 with brake fluid. Therefore, the piston 12 is always brought into contact with the grease or the brake fluid, so that the piston would never shake even if it has been used for a long time. Further, no rust or no dust is generated in the cylinder so that the normal operation of the wheel cylinder can be kept for a long time.

In the second embodiment shown in FIG. 2, a wheel cylinder having a groove provided in the outer surface of the piston is explained. However, it should be noted that the same effect can be obtained in a separate type wheel cylinder where no groove is provided in the piston but a cup seal is just put between the piston and the cylinder body.

Figure 3:
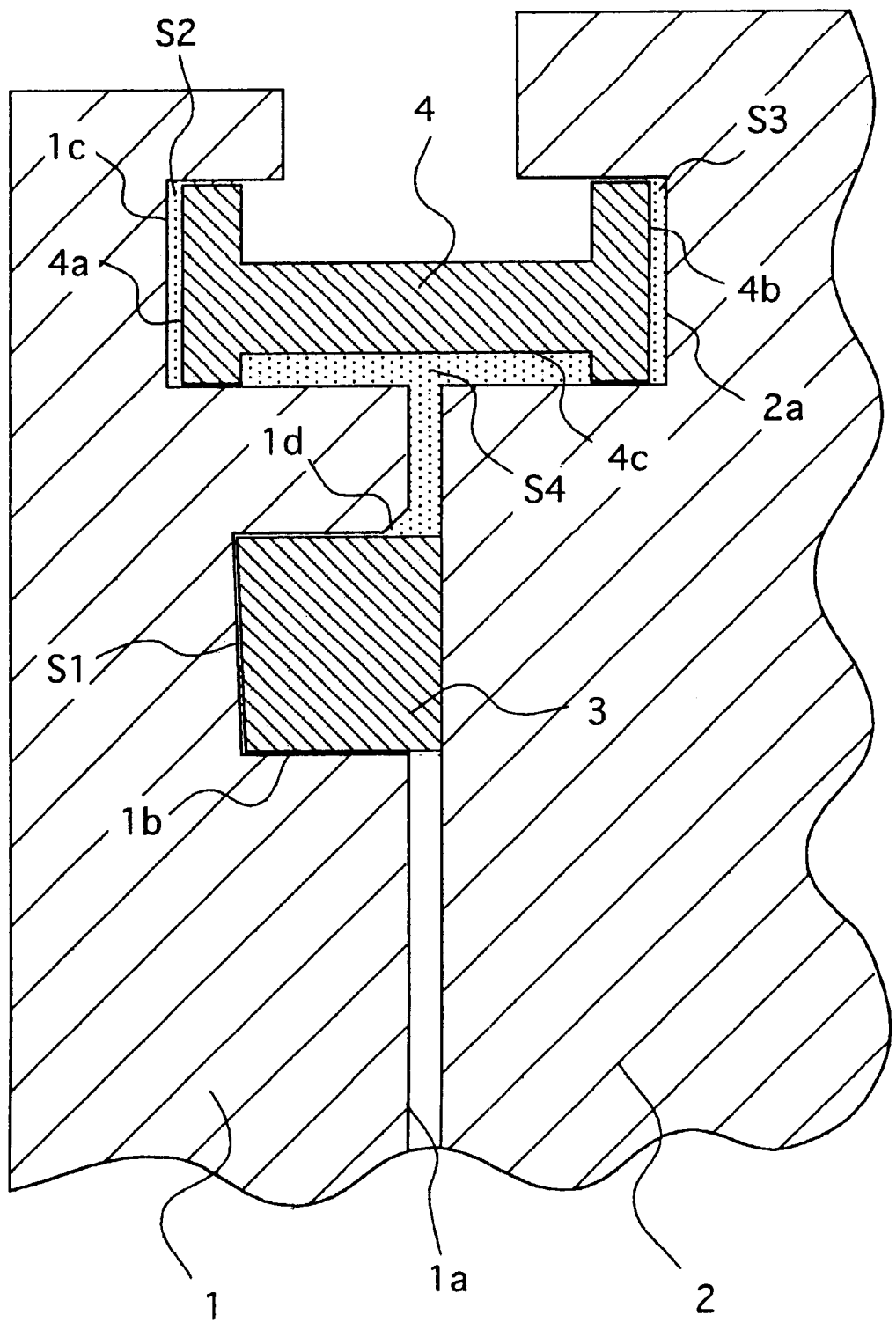
FIG. 3 is a cross-sectional view partially illustrating a caliper for use in a disk brake system according to a variation of the first embodiment shown in FIG. 1.

FIG. 3 is a cross sectional view showing a construction of the variation of the first embodiment of the present invention, where a caliper for use in a disk brake system is partially represented. It should be noted that the same reference numbers are used for the same elements in FIG. 1 and the explanation thereof is omitted here.

In the caliper shown in FIG. 3, the corner 1d of the groove 1b formed in the caliper body 1 for setting piston seal 3 is latched on the dust boots side. The arrangement of the latch portion 1d makes it easier to put the grease in the space S4, which is necessary to be filled with the grease.

Figure 4:
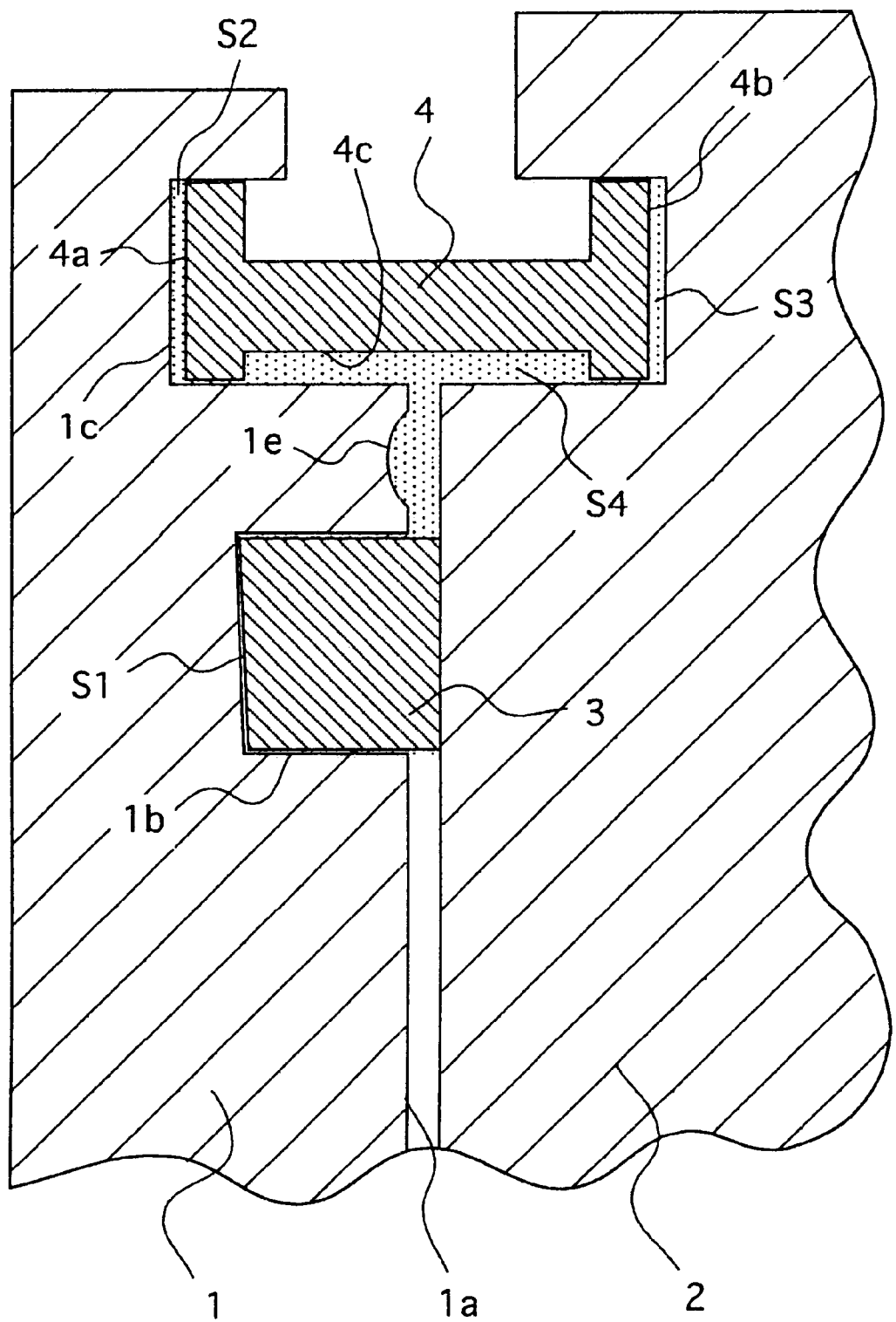
FIG. 4 is a cross-sectional view partially representing a caliper for use in a disk brake system according to another variation of the first embodiment shown in FIG. 1.

FIG. 4 is a cross-sectional view depicting another variation of the caliper. In this variation, another groove 1e is provided in the inner surface of the caliper body 1 between the groove 1b for setting piston seal 3 and the groove 1c for holding the dust boots 4. As the same as the variation shown in FIG. 3, by the arrangement of the groove 1e, the grease is apt to be easily collected there, so that the purpose of the present invention can be realized more easily. In this variation, the concave portion has a half-circled cross section, but the shape of the groove 1e is not limited to this variation.

Figure 5:
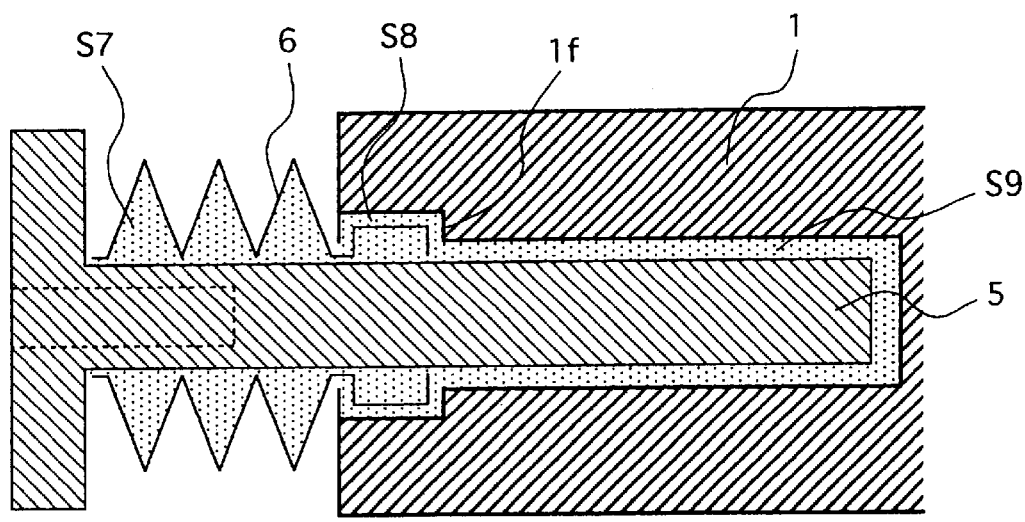
FIG. 5 is a cross-sectional view partially showing a floating type of a caliper for use in a disk brake system according to the present invention.

FIG. 5 is a cross-sectional view illustrating a part of a floating type of a caliper, at which the caliper is installed with the aid of a pin 5 so as to be slid back and forth. As shown in FIG. 5, a portion of the pin 5 protruded from the caliper body 1 is covered by dust boots 6 having a bellows section. In such a type of caliper, it is preferred to put a sufficient amount of grease in a space S7 formed between the boots 6 and the pin 5, in a space S8 formed between the outer surface of the boots 6 and the inner surface 1f of caliper body 1, and in a space S9 formed between the outer surface of the pin 5 and the inner surface 1f of the caliper body 1. Some kind of a floating type caliper uses a rubber material (not shown) between the pin 5 and caliper body 1. In such a case, it is requested to apply the grease between the caliper body 1 and the rubber material.

The method for assembling the caliper for use in a disk brake system according to the invention will be explained.

First, on the whole inside surface of the groove 1b of the caliper body 1 for setting a piston seal 3 and on the whole outer surface of the piston seal 3, is applied grease uniformly without exception, and the piston seal 3 is installed in the groove 1b. By the existence of grease between the groove 1b and the piston seal 3, the adherence of the piston seal 3 in the groove 1b becomes high, so that the movement of the piston seal 3 during the braking operation becomes smooth.

When the piston seal 3 is set into the piston seal groove 1b, the level of the inner surface of the piston seal 3 becomes higher than that of the inner surface of the disk caliper 1 (the surface of the cylinder portion 1a), so that a step is formed there. Then grease should be further applied around the piston seal 3 so as to bury the step with the grease.

Next, grease is applied on the outer surface of the piston from its top end (the end on the insertion side of the piston when inserting the piston into the caliper body 1) to almost half of the piston as a whole; then the top portion of the piston 2 is inserted into the caliper body 1 until the position some distance from the inner end 3a of the piston seal 3 (about 5 to 10 mm from the end 3a), and then extracting the piston once. At this time, since the grease is removed from the top end of the piston and adheres onto the inner surface of the caliper body 1 and the piston seal 3, grease should be applied to the top half portion of the piston again. Repeating the operation several times, and then settle the piston into the caliper body 1 finally. By this operation, the grease applied on the top half of the piston is urged against the upper side (dust boots side) of the piston seal 3; when inserting the piston as a whole into the caliper body, a sufficient amount of the grease would exist at the upper side (dust boots side) of the piston seal 3. By repeating the operation, the initial fitting of the piston and the caliper body 1 becomes good.

Next, on the outer and inner side surfaces 4a and 4b of the dust boots (surface 4b opposite to the groove 2a formed in the piston 2 and surface 4a opposite to the groove 1c formed in the caliper body 1), and inside of the concave portion 4c of the dust boots 4 on the piston seal side, is applied a sufficient amount of grease, then settle the dust boots 4 in the groove 1b of the caliper body 1 and in the groove 2a of the piston 2. It should be noted that in case of using dust boots having no concave portion 4c, a sufficient amount of grease should be applied on the surface of the dust boots on the piston seal side.

By assembling the caliper in the above-mentioned manner, grease pervades over the portions which should have sufficient grease in order to realize a smooth movement of the piston 2 and the piston seal 3 during when the braking operation is conducted. According to the arrangement of the caliper mentioned above, the shaking of the piston and the "brake drag" caused by the abnormal returning operation of the piston can be prevented.

Any kind of grease for use in assembling or overhauling vehicles can be used to conduct the present invention. However, according to the inventor's experience, it is proved that a better effect can be obtained by using the grease of NICHIMORY FX 2300 (product name) manufactured by Nichimori of Osaka Dockyard Co., Ltd.

An experiment, in which the grease of NICHIMORY FX 2300 was used to assemble, will be explained below. In the experiment, the grease is applied by hand, but it may be possible to use a spray device instead.

Figure 6:
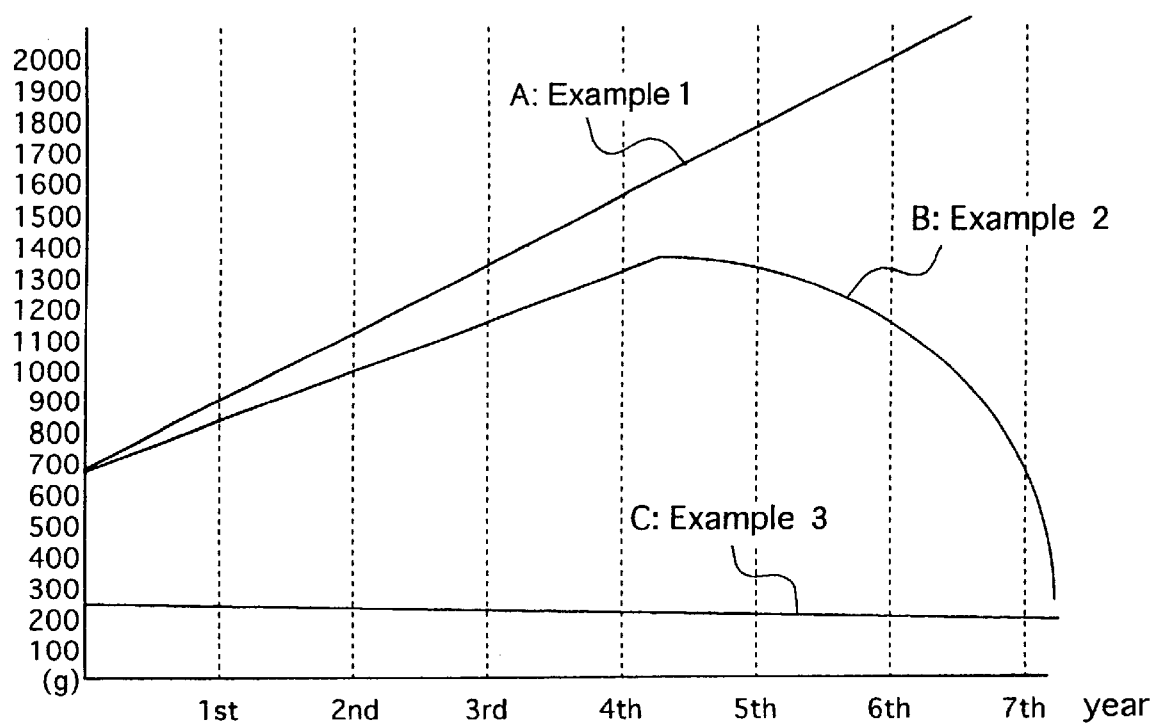
FIG. 6 is a graph showing an experimental result where the amount of "brake drag" generated in a brake system having a conventional caliper and that in a brake system having a caliper according to the invention are compared.

FIG. 6 is a graph showing the degree of "brake drag", comparing brake systems using a conventional caliper and a caliper according to the present invention. In FIG. 6, the period of use of the brake system is mentioned on the horizontal axis and the degree of "brake drag" caused in the brake system is shown on the vertical axis: the line A for Example 1 shows how much "brake drag" was caused in the disk brake system where a conventional caliper is used. The line A proves that the degree of "brake drag" becomes greater as the period of use of the brake system is increased. The line B for Example 2 shows a case that a newly manufactured vehicle was be used until 4 and half year, then the caliper of the brake system of the vehicle was repaired applying the method according to the present invention. That is to say, when repairing the brake system, a sufficient amount of the grease of NICHIMORY FX2300 was put in the spaces, which should be filled with the grease. The line B proves that the degree of "brake drag" is largely decreased after the repairing. The line C for Example 3 shows the case that the caliper according to the present invention was used when the vehicle was newly manufactured, where the grease of NICHIMORY FX2300 exists in the spaces which are required to be filled with grease to realize the effect of the present invention. It is apparent from the line C that the degree of "brake drag" was not aggravated even when seven years has passed after the vehicle had begun to be used.

Figure 7:
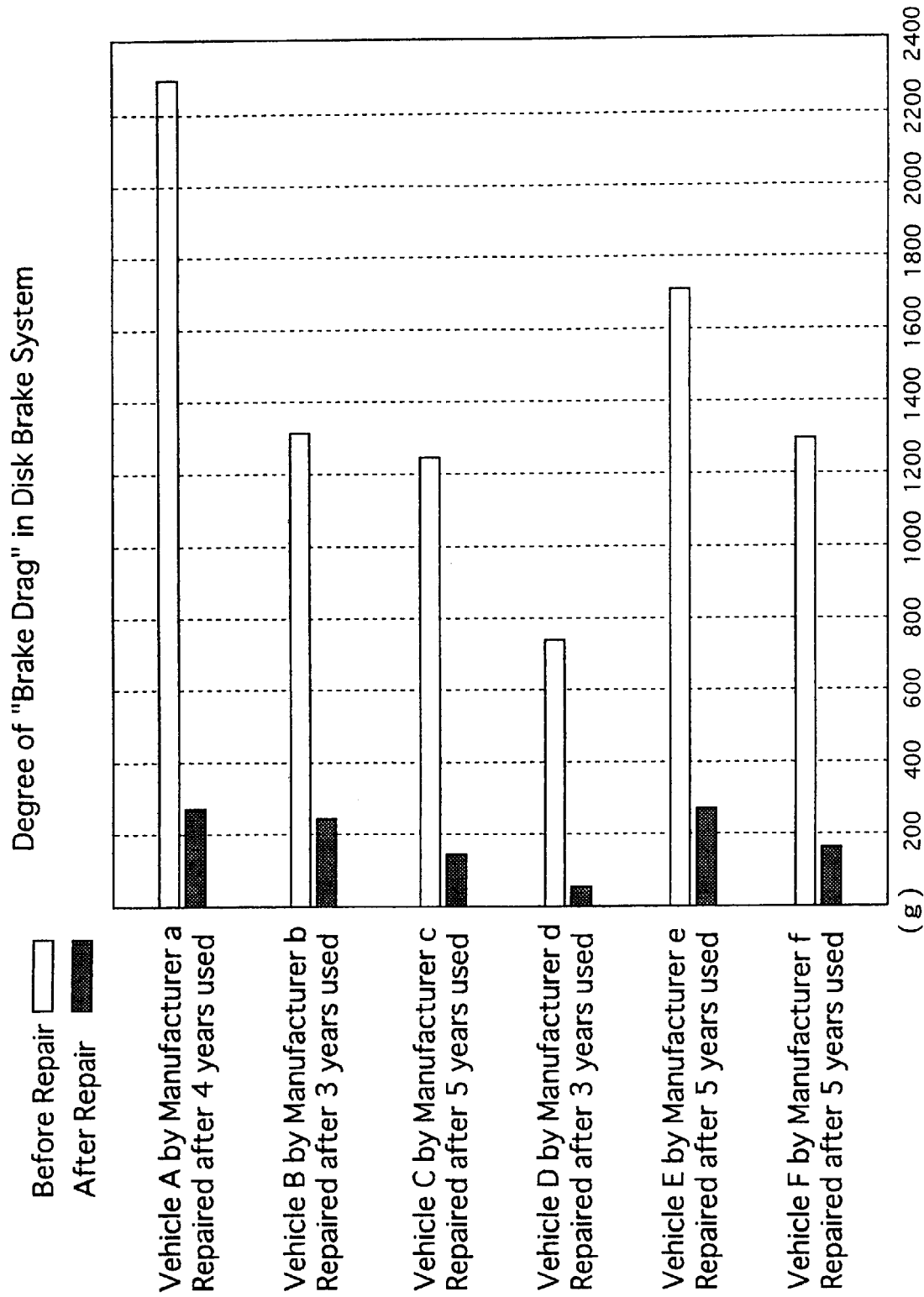
FIG. 7 is another graph depicting an experimental result where the amount of "brake drag" generated in a brake system is compared before and after the repairing according to the invention was conducted.

FIG. 7 is a graph comparing the degrees of "brake drag" in six samples of motor vehicle manufactured by different motor vehicle manufacturing companies; the caliper of each of the motor vehicles was repaired using the method according to the present invention so as to put NICHIMORIY FX2300 grease in the necessary spaces, some years after the vehicles had begun to be used; the degrees of "brake drag" before and after the repair are compared. The graph in FIG. 7 proves that the degree of "brake drag" is improved after the repair irrespective of the manufacturer of the vehicles.

In the above-mentioned embodiments, the floating type caliper and leading trailing type wheel cylinder are explained; however, the present invention can also be applied to the other type of caliper, i.e. a floating yoke type caliper or a fixed type caliper, and to the other type of wheel cylinder, i.e. the two leading type of wheel cylinder.

As explained above, in the caliper or the wheel cylinder according to the present invention, the reciprocal movement of the piston is always conducted in a proper manner by the existence of grease in the necessary spaces. Therefore, the shaking phenomenon of the piston can be prevented and the "brake drag" is not caused for a long time. Further, since rust or dust is not apt to be generated in the cylinder, it can be prevented that the pads are abraded so that the powder of the pads becomes sprinkled to the outside. Furthermore, according to the invention, since the friction can be restricted which is caused when the piston seal (or cup seal) in the caliper (or in the cylinder) is slid being brought contact with the piston, the temperature in the caliper (the cylinder) and the temperature of the pads can always be kept low, so that the powder of the pads adhering on the disk can be washed out easily by cold water.

What is claimed is:

1. A caliper for use in a disk type brake system comprising at least a caliper body having a cylinder portion, a piston, a piston seal, and dust boots; said caliper body comprising a first groove for setting said piston seal and a second groove for setting said dust boots, and said piston comprising a third groove for setting said dust boots, wherein a sufficient amount of grease exists in a space formed by said first groove for setting said piston seal and said piston seal attached around said piston, in a space formed by an outer side surface of said dust boots and said second groove formed in said caliper body, in a space formed by an inner side surface of said dust boots and said third groove formed in said piston, and in a space formed by said dust boots, said caliper body, said piston and said piston seal.

2. A caliper for use in a disk type brake system according to claim 1, wherein an edge portion on dust boots side of said first groove formed in said caliper body is latched.

3. A caliper for use in a disk type brake system according to claim 1, wherein said caliper body comprises a fourth groove provided between said first groove and said second groove.

4. A caliper for use in a disk type brake system according to claim 3, wherein said fourth groove has a semi-circular cross section.

5. A caliper for use in a disk type brake system according to claim 1, wherein said grease also exists on a contacts surface between said dust boots and said piston and on a contact surface between said dust boots and said caliper body.

6. A caliper for use in a disk type brake system according to claim 1, wherein said caliper is arranged as a floating type caliper where the caliper body is movably installed with the aid of a pin, wherein said caliper body has a section for receiving said pin and a part of the pin protruded from the caliper body is covered by another dust boots, and wherein a sufficient amount of said grease also exists in a space formed by said another dust boots and said pin, in a space formed between said another dust boots and the pin receiving section of said caliper body, and in a space formed between an outer surface of the pin and said pin receiving section of said caliper body.

7. A caliper for use in a disk type brake system according to claim 6, wherein said dust boots has a bellows portion and a sufficient grease exists in said bellows portion.

* * * * *